US011888733B2

(12) United States Patent
Chan

(10) Patent No.: US 11,888,733 B2
(45) Date of Patent: Jan. 30, 2024

(54) LABEL DEDUCTION WITH FLEXIBLE-ALGORITHM

(71) Applicant: Juniper Networks, Inc., Sunnyvale, CA (US)

(72) Inventor: Wai Tong Louis Chan, Hong Kong (CN)

(73) Assignee: Juniper Networks, Inc., Sunnyvale, CA (US)

( * ) Notice: Subject to any disclaimer, the term of this patent is extended or adjusted under 35 U.S.C. 154(b) by 220 days.

(21) Appl. No.: 17/059,398

(22) PCT Filed: Sep. 27, 2020

(86) PCT No.: PCT/CN2020/118031
§ 371 (c)(1),
(2) Date: Nov. 27, 2020

(87) PCT Pub. No.: WO2022/061798
PCT Pub. Date: Mar. 31, 2022

(65) Prior Publication Data
US 2022/0303212 A1  Sep. 22, 2022

(51) Int. Cl.
*H04L 45/50* (2022.01)
*H04L 45/02* (2022.01)
(Continued)

(52) U.S. Cl.
CPC ............ *H04L 45/507* (2013.01); *H04L 45/04* (2013.01); *H04L 45/24* (2013.01); *H04L 45/34* (2013.01)

(58) Field of Classification Search
None
See application file for complete search history.

(56) References Cited

U.S. PATENT DOCUMENTS 6,151,319 A 11/2000 Dommety et al.
9,660,897 B1 5/2017 Gredler
(Continued)

FOREIGN PATENT DOCUMENTS

CN 101019385 A 8/2007
CN 101155119 A 4/2008
(Continued)

OTHER PUBLICATIONS

Response to Communication Pursuant to Rule 69 EPC dated Apr. 4, 2022, from counterpart European Application No. 21159387.6, dated Sep. 26, 2022, 60 pp.
(Continued)

*Primary Examiner* — Xavier S Wong
(74) *Attorney, Agent, or Firm* — Shumaker & Sieffert, P.A.

(57) ABSTRACT

A flexible-algorithm routing method comprises: receiving, by a first router, a route advertisement including a base node label, for a second router, associated with a segment routing path without flexible-algorithm, wherein the second router participates in a flexible-algorithm; deducing, by the first router and from the base node label, a node label, for the second router, associated with a segment routing path with the flexible-algorithm; and constructing, by the first router, a label stack including the node label for the second router to steer a packet to the second router via the segment routing path with the flexible-algorithm.

13 Claims, 5 Drawing Sheets

(51) Int. Cl.
*H04L 45/24* (2022.01)
*H04L 45/00* (2022.01)

(56) References Cited

U.S. PATENT DOCUMENTS

| | | | |
|---|---|---|---|
| 2006/0013212 | A1 | 1/2006 | Singh et al. |
| 2014/0254596 | A1 | 9/2014 | Filsfils et al. |
| 2020/0145319 | A1 | 5/2020 | Joseph et al. |
| 2020/0244588 | A1* | 7/2020 | Filsfils ............... H04L 43/0888 |
| 2020/0344151 | A1* | 10/2020 | Joseph ................ H04L 45/507 |
| 2021/0367883 | A1* | 11/2021 | Zhang ................. H04L 41/12 |
| 2022/0014394 | A1* | 1/2022 | Zhao ................... H04L 45/50 |

FOREIGN PATENT DOCUMENTS

| | | |
|---|---|---|
| CN | 101667961 A | 3/2010 |
| CN | 101958829 A | 1/2011 |
| CN | 104408174 A | 3/2015 |
| CN | 111147373 A | 5/2020 |
| CN | 111224874 A | 6/2020 |
| WO | 2020/187308 A1 | 9/2020 |

OTHER PUBLICATIONS

International Search Report and Written Opinion of International Application No. PCT/CN2020/118031, dated May 26, 2021, 9 pp.
Callon, "Use of OSI IS-IS for Routing in TCP/IP and Dual Environments," RFC 1195, Network Working Group, Dec. 1990, 80 pp.
Moy, "OSPF Version 2," Network Working Group, RFC 2328, Apr. 1998, 244 pp.
Psenak et al. "IGP Flexible Algorithm," Network Working Group, draft-ietf-lsr-flex-algo-07.txt, Internet-Draft, Apr. 1, 2020, 34 pp.
Mohapatra et al. "The BGP Encapsulation Subsequent Address Family Identifier (SAFI) and the BGP Tunnel Encapsulation Attribute," Network Working Group, RFC 5512, Apr. 2009, 13 pp.
Rosen, "Using BGP to Bind MPLS Labels to Address Prefixes," Internet Engineering Task Force (IETF), RFC 8277, Oct. 2017, 24 pp.
Filsfils et al., "Segment Routing Architecture," Internet Engineering Task Force (IETF), RFC 8402, Jul. 2018, 33 pp.
Filsfils et al. "Segment Routing Use Cases," draft-filsfils-spring-segment-routing-use-cases-01, Network Working Group, Internet-Draft, Oct. 21, 2014, 35 pp.
Filsfils et al., "Segment Routing Architecture," draft-filsfils-spring-segment-routing-04, Internet-Draft, Network Working Group, Jul. 3, 2014, 18 pp.
Previdi et al., "Source Packet Routing in Networking (SPRING) Problem Statement and Requirements," RFC 7855, Internet Engineering Task Force, IETF, May 2016, 19 pp.
Coltun et al., "OSPF for IPv6," Network Working Group, RFC 5340, Jul. 2008, 95 pp.
Sheth et al., "OSPF Hybrid Broadcast and Point-to-Multipoint Interface Type," RFC 6845, Internet Engineering Task Force, IETF, Jan. 2013, 9 pp.
Lindem et al. "OSPFv3 Link State Advertisement (LSA) Extendibility," Internet Engineering Task Force (IETF), RFC 8362, Apr. 2018, 33 pp.
Oran, "OSI IS-IS Intra-domain Routing Protocol," RFC 1142, Network Working Group, Feb. 1990, 157 pp.
Li et al., "IS-IS Extensions for Traffic Engineering," Network Working Group, RFC 5305, Oct. 2008, 18 pp.
Filsfils et al., "Segment Routing with MPLS data plane," draft-filsfils-spring-segment-routing-mpls-03, Internet-Draft, Network Working Group, Jul. 31, 2014, 14 pp.
Extended Search Report from counterpart European Application No. 21159387.6, dated Aug. 27, 2021, 12 pp.
First Office Action and Search Report, and translation thereof, from counterpart Chinese Application No. 202080004601.3 dated Feb. 25, 2023, 5 pp.
International Preliminary Report on Patentability from International Application No. PCT/CN2020/118031 dated Apr. 6, 2023, 5 pp.
Office Action, and translation thereof, from counterpart Chinese Application No. 202080004601.3 dated Aug. 30, 2023, 13 pp.

\* cited by examiner

LABEL DEDUCTION WITH FLEXIBLE-ALGORITHM

This application is a U.S. national phase application under 37 U.S.C. § 371 of international application number PCT/CN2020/118031 filed on Sep. 27, 2020. The entire contents of international application number PCT/CN2020/118031 is incorporated herein by reference.

TECHNICAL FIELD

The disclosure relates to computer networks and, more particularly, to advertising routes within computer networks.

BACKGROUND

A computer network is a collection of interconnected computing devices that exchange data and share resources. In a packet-based network, such as the Internet, computing devices communicate data by dividing the data into small blocks called packets, which are individually routed across the network from a source device to a destination device. The destination device extracts the data from the packets and assembles the data into its original form. Certain devices (i.e., nodes) within the network, referred to as routers, use routing protocols to exchange and accumulate topology information that describes the network. This allows a router to construct its own routing topology map of the network. Upon receiving an incoming data packet, the router examines keying information within the packet and forwards the packet in accordance with the accumulated topology information.

Many routing protocols fall within a protocol class referred to as Interior Gateway Protocol (IGP) in which flooding-based distribution mechanisms are used to announce topology information to routers within the network. These routing protocols typically rely on routing algorithms that require each of the routers to have synchronized routing topology information for a given area, referred to as the IGP area. Other routing protocols may include Border Gateway Protocol (BGP) that is an exterior gateway protocol used to exchange routing information among routers in different areas or domains. Devices that implement BGP use routing information to maintain a database of network reachability information, which is exchanged with other devices that implement BGP.

Packet-based networks increasingly utilize label switching protocols for traffic engineering and other purposes. Multi-Protocol Label Switching (MPLS) is a mechanism used to engineer traffic patterns within Internet Protocol (IP) networks according to the routing information maintained by the routers in the networks. By utilizing MPLS protocols, label switching routers can forward traffic along a particular path through a network to a destination device, i.e., a Label Switched Path (LSP), using labels prepended to the traffic. An LSP defines a distinct path through the network to carry MPLS packets from the source device to a destination device. As one example, routers may employ segment routing techniques, such as by using a Source Packet Routing in Networking (SPRING) paradigm, to advertise network segments between nodes using an interior gateway protocol (IGP) or border gateway protocol (BGP) and build single or multi-hop tunnels. To perform segment routing, an ingress router prepends one or more labels in a label stack, e.g., a segment list, to a packet, and intermediate routers along the path remove labels from the label stack applied to the packet as the packet is forwarded through the network.

Devices that support segment routing techniques may also support constraint-based path computation in which path computations are performed based on various constraints, such as to configure a path on a particular subset of links and/or nodes associated with any characteristic or property of the network. One example of constraint-based path computation is "flexible-algorithm" (otherwise referred to herein as "flex-algo") in which the network device performs path computation based on a calculation type, metric type, and one or more constraints. Devices that implement flexible-algorithm techniques may steer traffic along the constraint-based paths rather than a default path, such as a shortest path.

SUMMARY

In general, this disclosure describes techniques for label deduction with flexible-algorithm. For example, network devices (e.g., routers) may use flexible-algorithm techniques to compute constraint-based segment routing LSPs to route traffic. For each flexible-algorithm a router participates in, the router is configured with a segment identifier (SID) (otherwise referred to herein as "label") that uniquely identifies the router for the flexible-algorithm. A router typically advertises a node label for a flexible-algorithm to other routers such that these routers may construct a label stack with the node label to send traffic to the advertising router. As the network increases in scale, such as with the addition of network devices and/or network slices, the number of labels advertised and stored is also increased, leading to an undesired increase in network resource consumption. According to the disclosed techniques, a network device need only send an advertisement (e.g., using BGP labeled unicast (BGP-LU) or IGP) with a node label for a default segment route (e.g., a segment route without flexible-algorithm), referred to as a "base node label," from which a receiving router may use the base node label to deduce node labels associated with other flexible-algorithms.

In one example, an area border router (ABR) may receive a base node label from an advertising router within the same IGP area and send an advertisement route (e.g., BGP-LU message or IGP message) including the base node label for the advertising router. For example, the ABR may send a BGP update message including Network Layer Reachability Information specifying a prefix of the advertising router and the base node label for the advertising router. As another example, the ABR may send an IGP message (e.g., Intermediate System to Intermediate System (IS-IS) or Open Shortest Path First (OSPF)) including a base node label for the advertising router. In any case, the router receiving the base node label for the advertising router may use the base node label to deduce node labels for the advertising router for other flexible-algorithms and construct label stacks using the deduced node labels to send traffic to the advertising router.

The techniques described in this disclosure may provide one or more technical advantages that realize at least one practical application. For example, by advertising only a base node label rather than a node label for each of the flexible-algorithms that a router participates in, the number of labels advertised and stored is decreased, therefore improving network resource consumption.

In one example, this disclosure is directed to a method comprising: receiving, by a first router, a route advertisement including a base node label, for a second router, associated with a segment routing path without flexible-algorithm, wherein the second router participates in a flexible-algorithm; deducing, by the first router and from the base node label, a node label, for the second router, associated with a segment routing path with the flexible-algorithm; and constructing, by the first router, a label stack including the deduced node label for the second router to steer a packet to the second router along the segment routing path with the flexible-algorithm.

In another example, this disclosure is directed to a method comprising: receiving, by a first router, a route advertisement including a label stack of a plurality of base node labels that uniquely identifies a second router, wherein the plurality of base node labels includes a base node label for the second router that is shared with another router and a base node label for an area border router in an Interior Gateway Protocol area including the second router, wherein the plurality of base node labels is associated with a segment routing path without flexible-algorithm, wherein the second router participates in a flexible-algorithm; deducing, by the first router and from the plurality of base node labels, a node label for the second router and a node label for the area border router, wherein the node label for the second router and the node label for the area border router are associated with a segment routing path with the flexible-algorithm; and constructing, by the first router, a label stack including the deduced node label for the second router and the deduced node label for the area border router to steer a packet to the second router along the segment routing path with the flexible-algorithm.

In another example, the disclosure is directed to a system comprising: a plurality of routers; a plurality of area border routers, wherein a first router of the plurality of routers and a first area border router of the plurality of area border routers is logically grouped into a first Interior Gateway Protocol (IGP) area of a plurality of IGP areas, wherein a second router of the plurality of routers and a second area border router of a plurality of area border routers is logically grouped into a second IGP area, wherein the first router, the second router, the first area border router, and the second area border router participate in a flexible-algorithm; wherein the first area border router is configured to: receive, from the first router, a base node label, for the first router, associated with a segment routing path without flexible-algorithm; and send, to the second area border router, a route advertisement including the base node label for the first router; and wherein the second router is configured to: receive, from the second area border router, the route advertisement including the base node label for the first router; deduce, from the base node label, a node label, for the first router, associated with a segment routing path with the flexible-algorithm; and construct a label stack including the node label for the first router to steer a packet to the first router via the segment routing path with the flexible-algorithm.

The details of one or more examples are set forth in the accompanying drawings and the description below. Other features, objects, and advantages will be apparent from the description, drawings, and from the claims.

DETAILED DESCRIPTION

Figure 1:
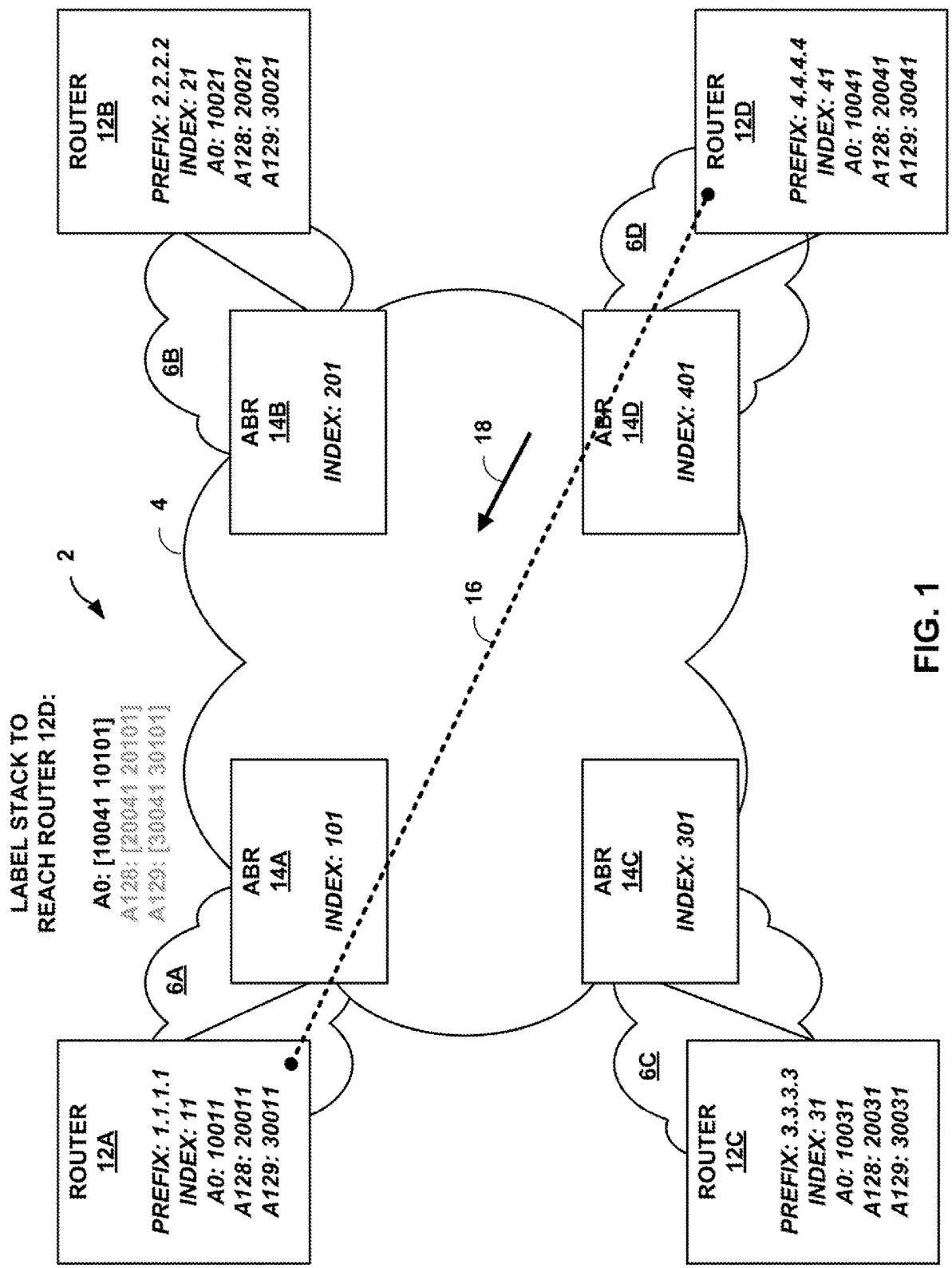
FIG. 1 is a block diagram illustrating an example network that provides label deduction with flexible-algorithm, in accordance with techniques described in this disclosure.

FIG. 1 is a block diagram illustrating an example network system 2 that provides label deduction with flexible-algorithm, in accordance with techniques described in this disclosure. In the example of FIG. 1, network system 2 includes multiple routing areas or domains 6A-6D (collectively, "areas 6") connected by an intermediate network 4.

Intermediate network 4 may represent a service provider network that is owned and operated by a service provider, which is usually a large telecommunications entity or corporation. Intermediate network 4 represents an L3 computer network, where reference to a layer followed by a number refers to a corresponding layer in the Open Systems Interconnection (OSI) model. Intermediate network 4 is an L3 network in the sense that it natively supports L3 operations as described in the OSI model. Common L3 operations include those performed in accordance with L3 protocols, such as the Internet protocol (IP). L3 is also known as a "network layer" in the OSI model and the "IP layer" in the TCP/IP model, and the term L3 may be used interchangeably with "network layer" and "IP" throughout this disclosure.

Intermediate network 4 may be coupled to one or more networks administered by the provider of intermediate network 4 or other providers, and may thus form part of a large-scale public network infrastructure, e.g., the Internet. Intermediate network 4 may provide computing devices logically grouped into areas 6 with access to the Internet, and may allow the computing devices within the areas to communicate with each other.

Intermediate network 4 may implement Multi-Protocol Label Switching (MPLS) forwarding and in such instances may be referred to as an MPLS network or MPLS backbone. MPLS is a mechanism used to engineer traffic patterns within Internet Protocol (IP) networks according to the routing information maintained by the routers in the networks. By utilizing MPLS protocols, label switching routers can forward traffic along a particular path through a network to a destination device, i.e., a Label Switched Path (LSP), using labels prepended to the traffic. An LSP defines a distinct path through the network to carry MPLS packets from a source device to a destination device.

In the example of FIG. 1, network system 2 may be partitioned into a hierarchy of Interior Gateway Protocol (IGP) levels, also referred to as "IGP areas" or "IGP domains," such as areas 6. Each IGP area includes a set of network devices under common administrative control and share a common IGP routing protocol, such as Intermediate System-Intermediate System (IS-IS) and Open Shortest Path First (OSPF). Further details regarding IS-IS are found in Callon, R., "Use of OSI IS-IS for Routing in TCP/IP and Dual Environments," RFC 1195, December 1990, the entire contents of which are incorporated by reference herein. Further details regarding OSPF are found in Moy, J., "OSPF Version 2," RFC 2328, April 1998, the entire contents of which are incorporated by reference herein. For example, area 6A includes router 12A and area border router 14A, area 6B includes router 12B and area border router 14B, area 6C includes router 12C and area border router 14C, and area 6D includes router 12D and area border router 14D.

Although additional network devices are not shown for ease of explanation, it should be understood that network 2 may comprise additional network and/or computing devices such as, for example, one or more additional routers, switches, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of network 2 are illustrated as being directly coupled, it should be understood that one or more additional network elements may be included along any of the illustrated links such that the network devices of network 2 are not directly coupled.

Routers 12 each maintain routing information that describes available routes through network system 2. Upon receiving an incoming packet, each of routers 12 examines information within the packet and forwards the packet in accordance with the routing information. In order to maintain an accurate representation of network system 2, routers 12 exchange routing information in accordance with a defined routing protocol, such as an Interior Gateway Protocol (IGP) when routing within an IGP area. Other routing protocols may include Border Gateway Protocol (BGP) that is an exterior gateway protocol used to exchange routing information among routers in different areas or domains.

In the example of FIG. 1, routers 12 may use segment routing techniques, e.g., the Source Packet Routing in Networking (SPRING) paradigm, to forward traffic along segment routing LSPs. Segment routing is a control-plane architecture that enables an ingress router to steer a packet through an ordered list of instructions (i.e., segments) by prepending one or more segment identifiers (SIDs) (otherwise referred to as "labels") to the packet, such as adjacency labels that identify adjacency segments (e.g., one-hop tunnel over a specific link between two nodes, irrespective of the link cost) and/or node labels that identify specific prefixes (e.g., multi-hop tunnel using shortest path links between two specific nodes or to a specific prefix). In other words, an ingress network device, e.g., router 12A, can steer a packet through a desired set of nodes and/or links by prepending the packet with an appropriate combination (stack) of labels. For segment routing within prefix segments, the "path" information is disseminated between the routers as part of the IGP link state information for the area.

One potential advantage of segment routing may be that the segment routing architecture can be directly applied to the MPLS data plane with no change in the forwarding plane. A network administrator need only allocate SIDs to particular routers and the segment routing IGP control-plane automatically builds the required MPLS forwarding constructs from a router to any other router. Segment routing is further described in Filsfils et. al., "Segment Routing Architecture," Internet-Draft draft-filsfils-rtgwg-segment-routing-00, June 2013, while segment routing use cases are described in Filsfils et. al., "Segment Routing Use Cases," Internet-Draft draft-filsfils-rtgwg-segment-routing-use-cases-01, July 2013. Further details regarding SPRING are found in (1) "Segment Routing Architecture," IETF draft draft-filfils-spring-segment-routing-04, Jul. 3, 2014; (2) S. Previdi, et al., "Source Packet Routing in Networking (SPRING) Problem Statement and Requirements," RFC 7855, May 2017; and (3) "Segment Routing with MPLS data plane," IETF draft draft-filsfils-spring-segment-routing-mpls-03, Aug. 1, 2014.

The different types of labels are further described hereinafter. An adjacency label may have a local semantic to a particular segment routing node, such as one of routers 12. In particular, an adjacency label steers traffic onto an adjacency (e.g., communication link and/or interface) or set of adjacencies. Thus, an adjacency label may be related to a particular network device. To use an adjacency label, a network device may initially assign the adjacency label to a particular adjacency and advertise the adjacency label to other network devices in the segment routing area using the IS-IS protocol or the OSPF protocol. The router may be the only router in the segment routing area to use the particular adjacency label. When a network device forwards a packet using the adjacency label, the network device may cause the packet to use the adjacency for the network device associated with the adjacency label. In this way, adjacency labels may be used to establish one-hop tunnels within the network.

A node label may have a global semantic within a segment routing area. That is, each of routers 12 that implement segment routing may be assigned a defined node label range (commonly referred to as Segment Routing Global Bock (SRGB)) that is unique to each respective network device within the segment routing area. An operator of network system 2 may ensure unique allocation of the different node label ranges from a global range to different routers. In addition to a node label range, each particular network device may also have a specific node identifier (e.g., node SID) that uniquely identifies the particular network device in the segment routing area. Each respective router may advertise its respective node identifier and node label range to other routers in the segment routing area using IS-IS or OSPF.

Based on routes determined using, e.g., shortest path routing, each of routers 12 may configure its forwarding state to push, pop, or swap node labels (corresponding to other nodes in the network) onto packets to forward such packets using the determined route to the destination. For instance, each of routers 12 may perform path selection using topology information learned by way of IGP to compute a shortest path within network system 2 on a hop-by-hop basis based on the routing information maintained by the routers. Each of routers 12 may then select a next hop along the locally computed shortest path and install forwarding information associated with the selected next hop in the forwarding plane of the network device, wherein the forwarding information identifies a network interface to be used when forwarding traffic and one or more labels to be applied when forwarding the traffic out the interface. The network devices use the next hops with the assigned labels to forward traffic hop-by-hop.

As illustrated in the example of FIG. 1, router 12A serves as an ingress router of segment routing LSP 16 (otherwise referred to herein as "segment routing tunnel" or "inter-area tunnel"), and hence, may be referred to in this disclosure as ingress router 12A. The sources of the network traffic received by ingress router 12A may comprise one or more devices (not shown in FIG. 1) and/or any public or private network or the Internet that provides traffic to ingress router 12A in network 2. Furthermore, router 12D may, in this example, serve as an egress router of segment routing LSP 16, and hence, may be referred to in this disclosure as egress router 12D. The destinations of the network traffic being forwarded on inter-area tunnel 16 may comprise one or more destination devices (not shown) and/or networks that may include local area networks (LANs) or wide area networks (WANs) that comprise a plurality of devices. For example, destination devices may include personal computers, laptops, workstations, personal digital assistants (PDAs), wireless devices, network-ready appliances, file servers, print servers or other devices that access the source via network system 2.

In some examples, routers 12 may further support constraint-based path computation (e.g., flexible-algorithm) for segment routing. The flexible-algorithms may define, for example, calculation types, metric types, and/or constraints used to compute constraint-based paths. For example, calculation types may include IGP algorithms defined under "Interior Gateway Protocol (IGP) Parameters" IANA registries or other calculation mechanisms, such as shortest path. Metric types may include the type of metrics used to compute the best paths along a constrained topology, such as an IGP metric, minimum unidirectional link delay, traffic engineering metric, etc. The constraints may, for example, restrict paths to links with specific affinities or avoid links with specific affinities. A type of constraint may be to compute a path along a subset of links associated with a particular color. Color is a generic notion which may represent any characteristic or property of the network, such as virtual topology, network slice, path computation algorithm, traffic engineering constraint (e.g., latency, bandwidth, etc.), administrative profile, etc.

To implement flexible-algorithm, routers 12 and ABRs 14 may, for example, advertise packets that (a) describe a set of constraints on the topology, (b) identify calculation-type, and (c) identify metric-type that are to be used to compute the best paths along the constrained topology. The combination of calculation-type, metric-type, and constraints is known as a "flexible-algorithm definition (FAD)," and may be identified by a flexible-algorithm identifier ("flexible-algorithm SID" or "flexible-algorithm label"), e.g., a value between 128 and 255. As one example, routers 12 may include the FAD and flexible-algorithm label within a type, length, and values ("TLV") of an OSPF packet or a sub-TLV of an IS-IS packet. Further examples of flexible-algorithm are described in P. Psenak, Ed., et al., "IGP Flexible Algorithm," Internet-Draft draft-ietf-lsr-flex-algo-07.txt, Apr. 1, 2020, the entire content of which is incorporated by reference herein. Additional examples of color constraints are described in P. Mohapatra et al., "The BGP Encapsulation Subsequent Address Family Identifier (SAFI) and the BGP Tunnel Encapsulation Attribute," Internet Engineering Task Force (IETF) RFC 5512, April 2009, the entire content of both of which are incorporated by reference herein.

Each of routers 12 is configured with a node label that uniquely identifies the router for a corresponding flexible-algorithm for which the router participates in. As one example, routers 12 that participate in a default segment route (e.g., segment route without flexible-algorithm identified by a flexible-algorithm label of 0, referred to herein as "flexible-algorithm 0" or "base flexible-algorithm") are assigned a node label within a node label range of 10000-19999. The node labels within the node label range for flexible-algorithm 0 is referred to herein as "base node label". Routers 12 that participate in a first flexible-algorithm (e.g., identified by a flexible-algorithm label of 128, referred to herein as "flexible-algorithm 128") are assigned a node label within a node label range of 20000-29999. Routers 12 that participate in a second flexible-algorithm (e.g., identified by a flexible-algorithm label of 129, referred to herein as "flexible-algorithm 129") are assigned a node label within a node label range of 30000-39999, and so on.

The node label may be computed based on an index of the router. In the example of FIG. 1, router 12A is configured with an index of 11, router 12B is configured with an index of 21, router 12C is configured with an index of 31, and router 12D is configured with an index of 41. ABR 14A is configured with an index of 101, ABR 14B is configured with an index of 201, ABR 14C is configured with an index of 301, and ABR 14D is configured with an index of 401.

For the base flexible-algorithm (e.g., flexible-algorithm 0), router 12A is assigned a base node label of 10011, router 12B is assigned a base node label of 10021, router 12C is assigned a base node label of 10031, and router 12D is assigned a base node label of 10041. Similarly, ABR 14A is assigned a base node label of 10101, ABR 14B is assigned a base node label of 10201, ABR 14C is assigned a base node label of 10301, and ABR 14D is assigned a base node label of 10401.

Node labels for the first flexible-algorithm (e.g., flexible-algorithm 128), are computed by offsetting the node label for flexible-algorithm 0 with 10000. For example, router 12A is assigned a node label of 20011, router 12B is assigned a node label of 20021, router 12C is assigned a node label of 20031, and router 12D is assigned a node label of 20041. Similarly, ABR 14A is assigned a node label of 20101, ABR 14B is assigned a node label of 20201, ABR 14C is assigned a node label of 20301, and ABR 14D is assigned a node label of 20401.

Similarly, node labels for the second flexible-algorithm (e.g., flexible-algorithm 129) are computed by offsetting the node label for flexible-algorithm 0 with 20000. For example, router 12A is assigned a node label of 30011 (node label for flexible-algorithm 0 offset by 20000), router 12B is assigned a node label of 30021 (node label for flexible-algorithm 0 offset by 20000), router 12C is assigned a node label of 30031 (node label for flexible-algorithm 0 offset by 20000), and router 12D is assigned a node label of 30041 (node label for flexible-algorithm 0 offset by 20000). Similarly, ABR 14A is assigned a node label of 30101, ABR 14B is assigned a node label of 30201, ABR 14C is assigned a node label of 30301, and ABR 14D is assigned a node label of 30401.

Typically, to configure participation in a flexible-algorithm, routers may advertise, in addition to a node label that uniquely identifies the router in flexible-algorithm 0, a node label that uniquely identifies the router for each of the flexible-algorithms for which the router participates in, along with the associated flexible-algorithm definition and flexible-algorithm label. For example, if a router participates in flexible-algorithm 128, the router typically advertises the base node label for the base flexible-algorithm 0 and the node label for flexible-algorithm 128. As the number of network devices in the network increase in scale, the number of labels advertised and stored in each of the routers is also increased, therefore causing each of the network devices to consume a large amount of network device resources.

In accordance with the techniques described in this disclosure, a router may need only advertise the base node label for flexible-algorithm 0 such that a receiving router may deduce the node labels for other flexible-algorithms for which the advertising router participates in.

Assume for example that router 12D participates in a first flexible-algorithm (e.g., flexible-algorithm 128) and a second flexible-algorithm (e.g., flexible-algorithm 129). Rather than advertising a node label for each of the flexible-algorithms that router 12D participates in, router 12D need only advertise its base node label (e.g., 10041) to other routers. For example, router 12D may disseminate the base node label 10041 to other routers 12 in network system 2 via ABRs 14.

The path information for the segments is disseminated or advertised between ABRs 14 using, for example, BGP labeled unicast (BGP-LU). BGP-LU provides for MPLS transport across IGP areas, e.g., areas 6. For example, network devices implementing BGP-LU may advertise a BGP-LU message, such as a BGP update message whose Network Layer Reachability Information (NLRI) specifies a router that has bound a specified MPLS label (or a stack of MPLS labels) to a specified address prefix (e.g., <prefix, [label]>) and a next hop identifying the router at which the prefix is bound to the label. Additional examples of BGP-LU are described in E. Rosen, "Using BGP to Bind MPLS Labels to Address Prefixes," RFC 8277, October 2017, the entire contents of which is incorporated by reference herein.

For example, ABR 14D may advertise BGP-LU message 18 including NLRI specifying a loopback address (e.g., prefix) of router 12D (e.g., 4.4.4.4) bound to the base node label (e.g., 10041). Router 12A (and other routers receiving the advertisement) receives BGP-LU message 18 with the base node label for router 12D and uses the base node label to deduce the node labels of router 12D for other flexible-algorithms. For example, router 12A may offset the base node label for router 12D to deduce router 12D's node labels for other flexible-algorithms.

Given that the node label range for flexible-algorithm 128 (e.g., 20000-29999) is the base node label range (e.g., 10000-19999) offset by 10000, router 12A may offset the base node label 10041 by 10000 such that router 12D's node label 20041 for flexible-algorithm 128 falls within the node label range for flexible-algorithm 128. Similarly, given that the node label range for flexible-algorithm 129 (e.g., 30000-39999) is the base node label range (e.g., 10000-19999) offset by 20000, router 12A may offset the base node label 10041 by 20000 such that router 12D's node label 30041 for flexible-algorithm 129 falls within the node label range for flexible-algorithm 129. Router 12A may also receive base node label 10101 from ABR 14A and deduce the node labels of ABR 14A for other flexible-algorithms.

Router 12A uses the deduced node labels to construct a label stack to steer packets along segment routing LSP, e.g., segment routing LSP 16, to reach router 12D. For example, to reach router 12D via a base flexible-algorithm, router 12A may construct a label stack ("A0") of [10041 10101], where the top label is the base node label 10101 of ABR 14A and the subsequent label is the base node label 10041 of router 12D. To reach router 12D via the first flexible-algorithm (e.g., flexible-algorithm 128), router 12A may construct a label stack ("A128") of [20041 20101], where the top label is the node label 20101 of ABR 14A and the subsequent label is the node label 20041 of router 12D. Similarly, to reach router 12D via the second flexible-algorithm (e.g., flexible-algorithm 129), router 12A may construct a label stack ("A129") of [30041 30101], where the top label is the node label 30101 of ABR 14A and the subsequent label is the node label 30041 of router 12D.

In some examples, network system 2 may implement a single IGP area rather than a plurality of IGP areas. For example, areas 6 may all use the same IGP (e.g., IS-IS). In these examples, network devices may alternatively use IGP to disseminate the base node label.

Figure 2:
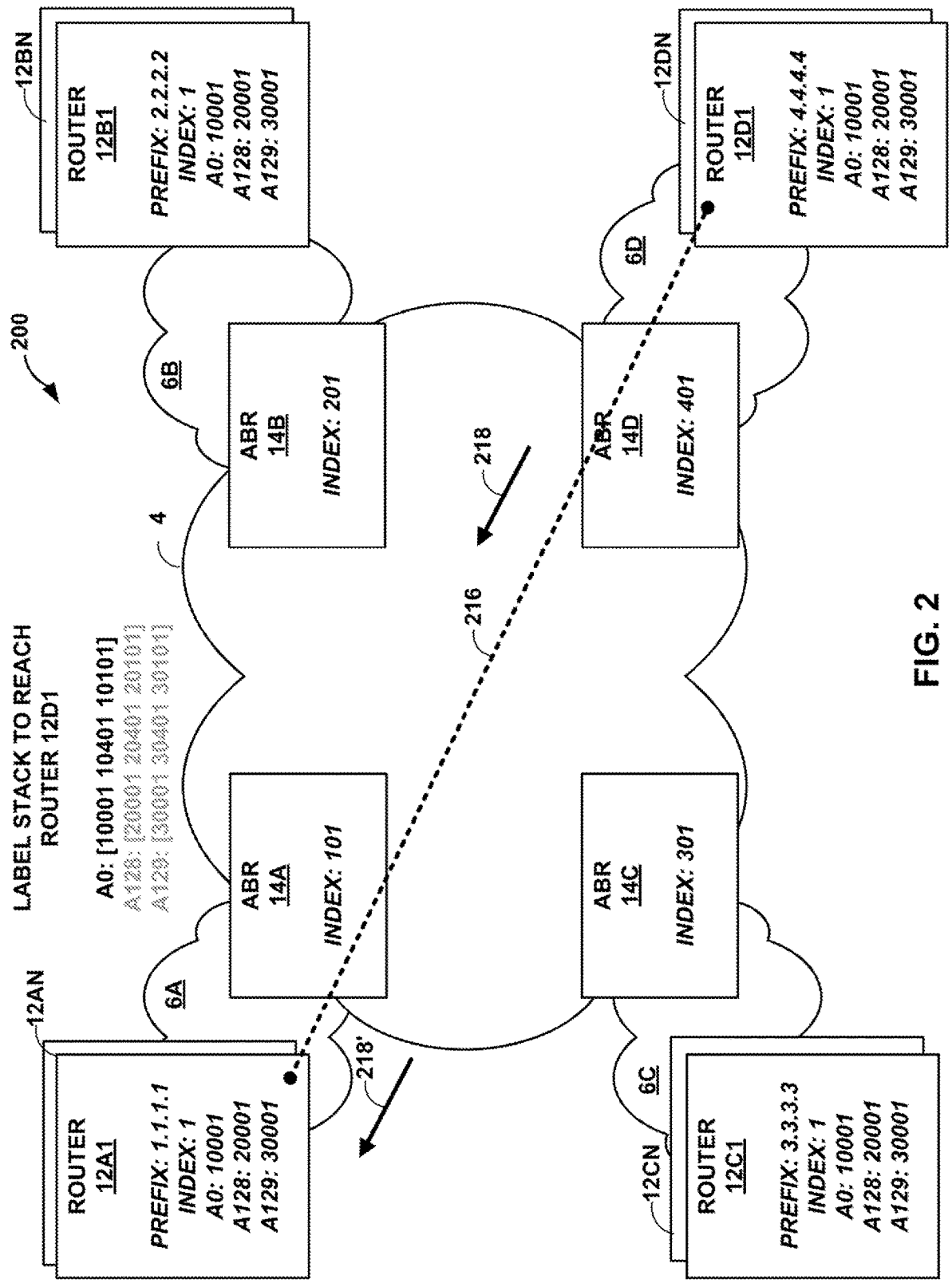
FIG. 2 is a block diagram illustrating another example of the network that provides label deduction with flexible-algorithm, in accordance with techniques described in this disclosure.

FIG. 2 is a block diagram illustrating another example network system that provides label deduction with flexible-algorithm, in accordance with the techniques described in this disclosure.

In this example, IGP area 6A includes routers 12A1-12AN (collectively, "routers 12A"), IGP area 6B includes routers 12B1-12BN (collectively, "routers 12B"), IGP area 6C includes routers 12C1-12CN (collectively, "routers 12C"), and IGP area 6D includes routers 12D1-12DN (collectively, "routers 12D"). In the example of FIG. 2, network system 200 may include an overlapping MPLS label space. For example routers 12A1, 12B1, 12C1, and 12D1 may use the same index and are each assigned a base node label of 10001 for flexible-algorithm 0, a node label of 20001 for flexible-algorithm 128, and a node label of 30001 for flexible-algorithm 129, and or other node labels of other flexible-algorithms.

To enable reachability to router 12D1 even if the base node label is the same as another router (e.g., router 12B1), ABR 14A may, in response to receiving an advertisement including router 12D1's prefix and base node label for flexible-algorithm 0, update the advertisement to include an additional label specifying the base node label for ABR 14D that sent the advertisement for router 12D1 such that router 12A1 may have reachability information to reach router 12D1.

For example, router 12D1 need only advertise its base node label 10001 to ABR 14D. ABR 14D constructs a BGP-LU message 218 specifying the prefix (e.g., 4.4.4.4) bound to the base node label (e.g., 10001) of router 12D1. In response to receiving BGP-LU message 218 from ABR 14D, ABR 14A (or other ABRs of other IGP areas receiving BGP-LU message 218) may update BGP-LU message 218 (illustrated as BGP-LU message 218') to further include a base node label for ABR 14D (e.g., 10301) and send BGP-LU message 218' to routers 12A in IGP area 6A. For example, BGP-LU message 218' may include a plurality of labels including the base node label 10001 for router 12D1 and the base node label 10401 for ABR 14D. The label stack of [10001 10401] is bound to the loopback address of 4.4.4.4. In this way, the label stack of [10001 10401] uniquely identifies router 12D1. Additional examples of including a plurality of labels in a BGP-LU message is described in RFC 8277, which is incorporated by reference above.

In response to receiving BGP-LU message 218', router 12A1 may deduce the node labels of router 12D1 and ABR 14D for other flexible-algorithms (e.g., by offsetting the base node labels of router 12D1 and ABR 14D), as described above with respect to FIG. 1. Using the labels, router 12A1 may construct a label stack to reach router 12D1. For example, to reach router 12D1 via a base flexible-algorithm, router 12A1 may construct a label stack ("A0") of [10001 10401 10101], where the top label is the base node label 10101 of ABR 14A, the subsequent label is the base node label 10401 of ABR 14D, and the bottom label is the base node label 10001 of router 12D. To reach router 12D1 via the first flexible-algorithm (e.g., flexible-algorithm 128), router 12A1 may construct a label stack ("A128") of [20001 20401 20101], where the top label is the node label 20101 of ABR 14A, the subsequent label is the node label 20401 of ABR 14D, and the bottom label is the node label 20001 of router 12D1. Similarly, to reach router 12D1 via the second flexible-algorithm (e.g., flexible-algorithm 129), router 12A1 may construct a label stack ("A129") of [30001 30401 30101], where the top label is the node label 30101 of ABR 14A, the subsequent label is the node label 30401 of ABR 14D, and the bottom label is the node label 30001 of router 12D1.

In this way, by updating the BGP-LU message to include an additional label for the ABR that advertised the BGP-LU message, a source router learn the labels needed to reach a particular destination router even if the base node label for the destination router is the same as the base node label for another router. By having shared or overlapping labels, network system 2 may provide a larger scale of network devices and a larger number of flexible-algorithms beyond the flexible-algorithm range of 128-255. Although the example described in FIG. 2 is described with respect to three labels, the techniques described in this disclosure may apply to any number of labels to further increase the scalability of network system 2.

Figure 3A:
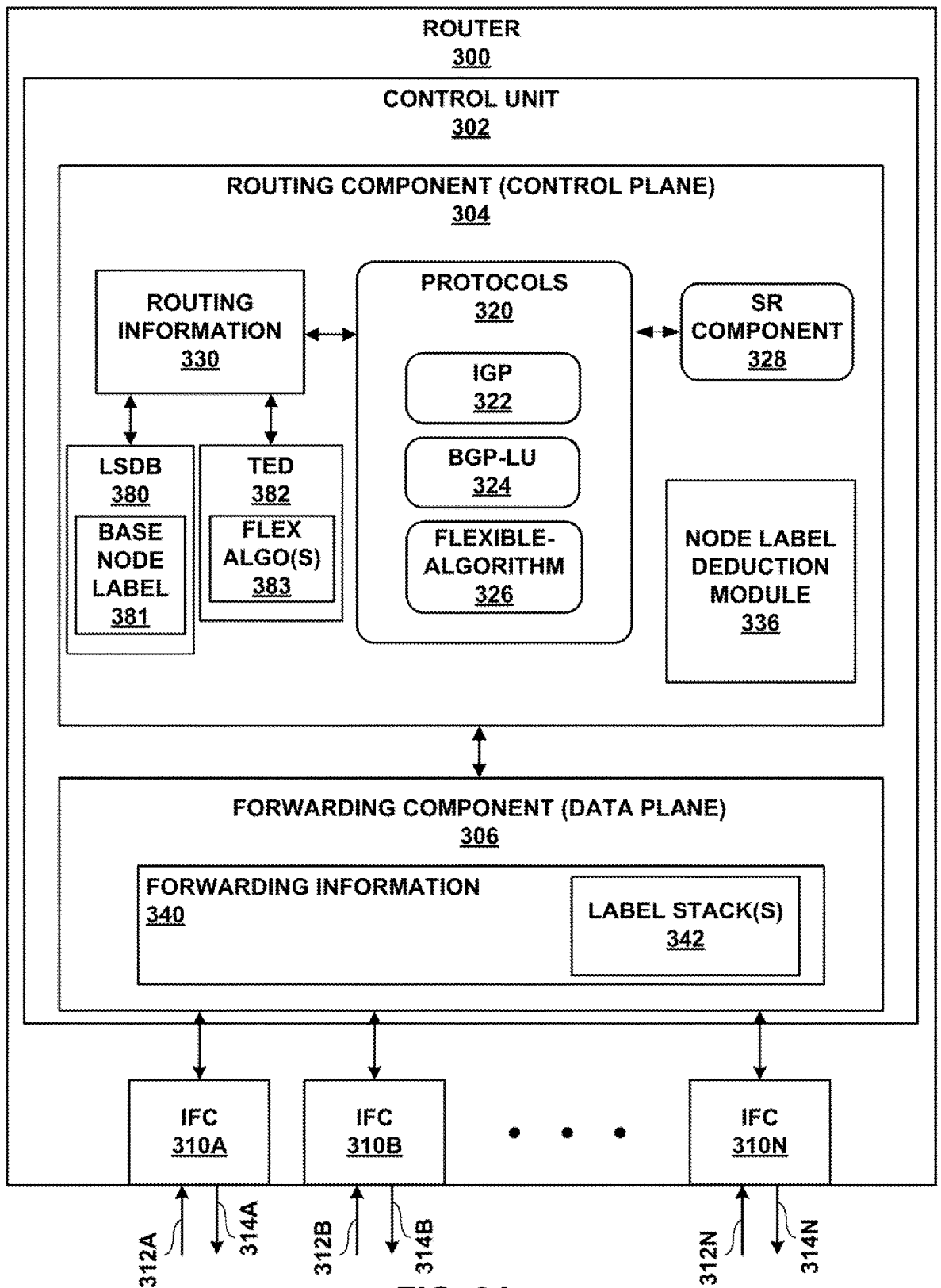
FIG. 3A is a block diagram illustrating an example network device capable of operating in accordance with the techniques described in this disclosure.

FIG. 3A is a block diagram illustrating an example router capable of operating in accordance with the techniques described herein. In the example of FIG. 3A, router 300 may represent ingress router 12A of FIG. 1. While described with respect to router 300, the techniques may be implemented by any other type of network device having routing functionality, and need not necessarily be a dedicated routing device. Thus, while described with respect to router 300, the techniques should not be limited to router 300 described with respect to the example of FIG. 3A. The architecture of router 300 illustrated in FIG. 3A is shown for example purposes only. The techniques of this disclosure are not limited to this architecture.

In the example of FIG. 3A, router 300 includes interface cards 310A-310N ("IFCs 310") that receive and send data units, such as packet flows, via inbound network links 312A-312N and outbound network links 314A-314N, respectively. Router 300 may include a chassis (not shown) having a number of slots for receiving a set of cards, including IFCs 310. Each card may be inserted into a corresponding slot of the chassis for electrically coupling the card to routing component 304 via high-speed switch (not shown), which may comprise, for example, switch fabric, switchgear, a configurable network switch or hub, or other high-speed switching mechanisms. IFCs 310 may be coupled to network links 312A-312N and 314A-314N via a number of physical interface ports (not shown). Generally, IFCs 310 may each represent one or more network interfaces by which router 300 may interface with links of a network.

In general, router 300 may include a control unit 302 that determines routes of received packets and forwards the packets accordingly via IFCs 310. In the example of FIG. 3A, control unit 302 includes routing component (control plane) 304 that configures and controls packet forwarding operations applied by forwarding component (data plane) 306. Control unit 302 may be implemented solely in software, or hardware, or may be implemented as a combination of software, hardware, or firmware. For example, control unit 302 may include one or more processors that execute program code in the form of software instructions. In that case, the various software components/modules of control unit 302 may comprise executable instructions stored on a computer-readable storage medium, such as computer memory or hard disk.

Routing component 304 provides an operating environment for various routing protocols 320 that execute at different layers of a network stack. Routing component 304 is responsible for the maintenance of routing information 330 to reflect the current topology of a network and other network entities to which router 300 is connected. In particular, routing protocols periodically update routing information 30 to accurately reflect the topology of the network and other entities based on routing protocol messages received by router 300. The protocols may be software processes executing on one or more processors. For example, routing component 304 includes network protocols that operate at a network layer of the network stack, which are typically implemented as executable software instructions.

Protocols 320 may include IGP 322 to exchange link state information, and facilitate forwarding of packets or other data units between routers within each of the routing domains. In some examples, IGP 322 may include an OSPF routing protocol in accordance with one or more of the RFC 2328, by J. Moy, entitled "OSPF Version 2," dated April 1998, RFC 5340, by R. Coltun et al. entitled "OSPF for IPv6," dated July 2008, RFC 6845, by N. Sheth et al., entitled "OSPF Hybrid Broadcast and Point-to-Multipoint Interface Type," dated January 2013, and RFC 8362, by A. Lindem et al., entitled "OSPFv3 Link State Advertisement (LSA) Extendibility," dated April 2018. In some examples, IGP 322 may include an IS-IS routing protocol that implements an IGP for exchanging routing and reachability information within a routing domain in accordance with RFC 1142, by D. Oran, entitled "OSI IS-IS Intra-domain Routing Protocol," dated February 1990 (republication of ISO/IEC 10589, last updated November 2002). IGP 373 may include IS-IS extensions that support traffic engineering, as described in RFC 5305, by T. Li et al., entitled "IS-IS Extensions for Traffic Engineering," dated October 2008. In some examples, router 300 may include both an OSPF component and an IS-IS component.

Router 300 uses IGP 322 to advertise packets that (a) describe a set of constraints on the topology, (b) identify calculation-type, and (c) identify metric-type that are to be used to compute the best paths along the constrained topology. The combination of calculation-type, metric-type, and constraints is known as a "flexible-algorithm definition (FAD)," and may be identified by a flexible-algorithm identifier ("flexible-algorithm SID" or "flexible-algorithm label"), e.g., a value between 128 and 255. As one example, routers 12 may include the FAD and flexible-algorithm label within a type, length, and values ("TLV") of an OSPF packet or a sub-TLV of an IS-IS packet. Router 300 may store one or more flexible-algorithm definitions and/or flexible-algorithm labels in a Traffic Engineering Database (TED), e.g., TED 382 (illustrated as "flex-algo(s) 383").

In the example of FIG. 3A, protocols 320 may include Border Gateway Protocol Labeled Unicast (BGP-LU) 324 to exchange a prefix bound to one or more MPLS labels. The BGP-LU protocol is described in additional detail in E. Rosen, "Using BGP to Bind MPLS Labels to Address Prefixes," RFC 8277, the entire content of which is incorporated by reference above. Protocols 320 may include other routing protocols (not shown), such as Label Distribution Protocol (LDP), Resource Reservation Protocol with Traffic Extensions (RSVP-TE), routing information protocol (RIP), or other network protocols.

By executing the routing protocols, routing component 304 identifies existing routes through the network and determines new routes through the network. Routing component 304 stores routing information 330 that includes, for example, known routes through the network. Forwarding component 306 stores forwarding information 340 that includes destinations of outbound links 314. Forwarding information 340 may be generated in accordance with routing information 330 and include a label stack 342 to be prepended to outgoing traffic.

Routing component 304 includes a segment routing (SR) component 328 to implement segment routing techniques that specify how router 300 may provision and advertise labels (i.e., SIDs for adjacency segments, prefix segments, or binding segments). As described in FIG. 1, an ingress router may use the SIDs to steer a packet through a controlled set of instructions, called segments, by prepending the packet with a SID label stack in a segment routing header. Based on SIDs, routing component 304 creates a segment routing label stack for the segment routing LSP. Upon receipt of packets destined for the egress router of the segment routing LSP, forwarding component 346 prepends the segment routing label stack 342 in forwarding information 340 onto the packets and forwards the packets in accordance with the segment routing label stack.

Routing component 304 includes a link state database (LSDB) 380 for storing domain topology information including SIDs and labels for provisioned segments, e.g., adjacency segments, prefix segments, and binding segments, within the routing domain of router 300. The contents of LSDB 380 are maintained in accordance with an IGP 373 and have the scope of a single routing domain. Routing component 304 further includes a Traffic Engineering Database (TED) 382 that augments LSDB 380 with traffic engineering link attributes (e.g., flexible-algorithm). Each of LSDB 380 and TED 382 may be in the form of a variety of data structures, such as a number of tables, link lists, radix trees, databases, flat files, or other data structures.

In accordance with the described techniques, routing component 304 includes a node label deduction module 336 to deduce, from a base node label, a node label for a router participating in one or more flexible-algorithms. For example, router 300 may represent an instance of ingress router 12A of FIG. 1. Router 300 may receive a base node label for router 12D and stores the base node label in LSDB 380 (illustrated as "base node label 381"). When router 300 receives a packet to be sent to router 12D via a flexible-algorithm, node label deduction module 336 may deduce, from the base node label 381 in LSDB 380, a node label for router 12D for the flexible-algorithm. For example, node label deduction module 336 may deduce the node label for router 12D for the flexible-algorithm by offsetting the base node label 383 to fall within a given node label range for the flexible-algorithm. As one example, if router 12D participates in a first flexible-algorithm (e.g., flexible-algorithm 128) that is allocated a node label range of 20000-29999 (which is the base node label range of 10000-19999 offset by 10000), node label deduction module 336 may offset the base node label 381 by 10000. If router 12D participates in a second flexible-algorithm (e.g., flexible-algorithm 129) that is allocated a node label range of 30000-39999 (which is the base node label range of 10000-19999 offset by 20000), node label deduction module 336 may offset the base node label 381 by 20000. Node label deduction module 336 may also deduce the node labels for other routers participating in the flexible-algorithm, such as an area border router within its IGP area (e.g., ABR 14A of FIG. 1).

Segment routing component 328 of router 300 then constructs one or more label stacks with the deduced node labels to send traffic along a segment routing LSP (e.g., segment routing LSP 16 of FIG. 1) for a given flexible-algorithm. For example, to reach router 12D via a base flexible-algorithm, segment routing component 304 of router 300 may construct a label stack ("A0") of [10041 10101], where the top label is the base node label 10101 of ABR 14A and the subsequent label is the base node label 10041 of router 12D. To reach router 12D via the first flexible-algorithm (e.g., flexible-algorithm 128), segment routing component 304 of router 300 may construct a label stack ("A128") of [20101], where the top label is the node label 20101 of ABR 14A and the subsequent label is the node label 20041 of router 12D. Similarly, to reach router 12D via the second flexible-algorithm (e.g., flexible-algorithm 129), segment routing component 376 of router 300 may construct a label stack ("A129") of [30041 30101], where the top label is the node label 30101 of ABR 14A and the subsequent label is the node label 30041 of router 12D. The one or more constructed label stacks are then installed in forwarding information 340 (illustrated as label stack(s) 342) and are prepended to the packet when sending the packet via one of outbound network links 357 toward ABR 14A.

Routing component 304 may include other components, units, modules not shown in FIG. 3A, such as a command line interface (CLI) that provides access for an administrator ("admin") to monitor, configure, or otherwise manage router 300. An administrator may use the interface to configure router 300 to perform the techniques described in this disclosure.

Figure 3B:
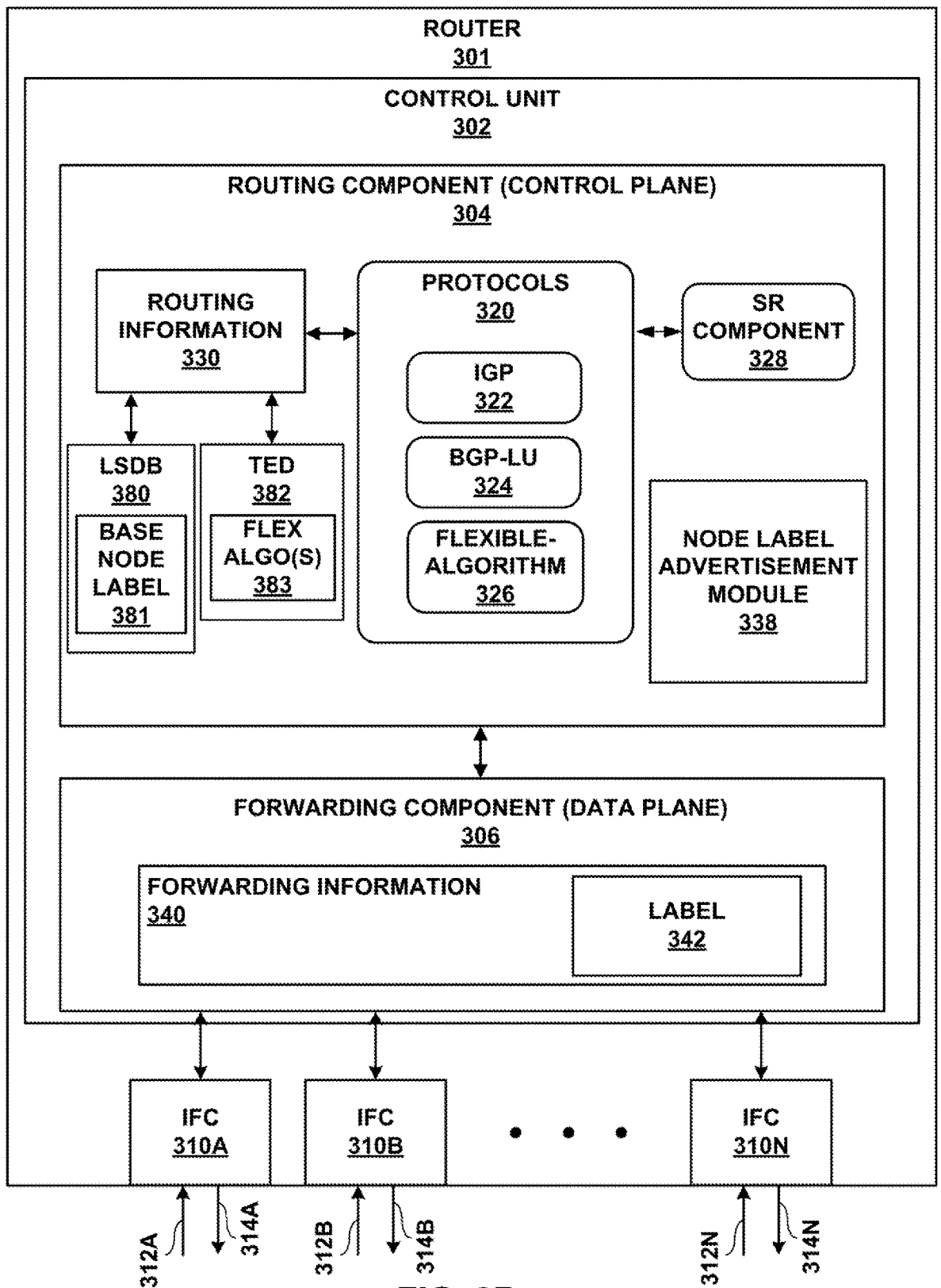
FIG. 3B is a block diagram illustrating another example network device capable of operating in accordance with the techniques described in this disclosure.

FIG. 3B is a block diagram illustrating an example router capable of operating in accordance with the techniques described herein. In the example of FIG. 3B, router 301 may represent any of ABRs 14 of FIG. 1 or FIG. 2. Router 301 of FIG. 3B is similar to router 300 of FIG. 3A, except as described below. While described with respect to router 301, the techniques may be implemented by any other type of network device having routing functionality, and need not necessarily be a dedicated routing device. Thus, while described with respect to router 301, the techniques should not be limited to router 301 described with respect to the example of FIG. 3B. The architecture of router 301 illustrated in FIG. 3B is shown for example purposes only. The techniques of this disclosure are not limited to this architecture.

In the example of FIG. 3B, router 301 includes a node label advertisement module 338 to advertise node labels in accordance with the techniques described in this disclosure. In one instance, router 301 may represent an ABR within an IGP area of an advertising router, such as ABR 14D of FIG. 1. In response to receiving a base node label for router 12D, router 301 may use BGP-LU 324 to send a BGP update message including an NLRI specifying a prefix of router 12D bounded to the base node label for router 12D. In this way, router 301 need only send the base node label for router 12D such that a router (e.g., router 12A of FIG. 1) that receives the BGP-LU message may use the base node label to deduce the node labels of router 12D for other flexible-algorithms. In some examples such as smaller scale networks, router 301 may use IGP 322 to send the base node label for router 12D.

In some examples, router 301 may represent an ABR within an IGP area of a router receiving the BGP-LU message, such as ABR 14A of FIG. 2. In these examples, router 301 may receive, from ABR 14D, a BGP-LU message 218 specifying the prefix (e.g., 4.4.4.4) bound to the base node label (e.g., 10041) of router 12D1. In some examples, node label advertisement module 338 of router 301 may update BGP-LU message 218 to further include an additional label specifying a base node label for ABR 14D that forwarded BGP-LU message and sends the updated BGP-LU message (e.g., BGP-LU message 218' of FIG. 2) to routers 12A1-12AN of IGP area 6A. In this way, a router that receives BGP-LU message 218', e.g., router 12A1, may deduce the node labels of router 12D1 and ABR 14D for other flexible-algorithms (e.g., by offsetting the base node labels of router 12D1 and ABR 14D) and use the deduced labels to construct label stacks to reach router 12D1.

Figure 4:
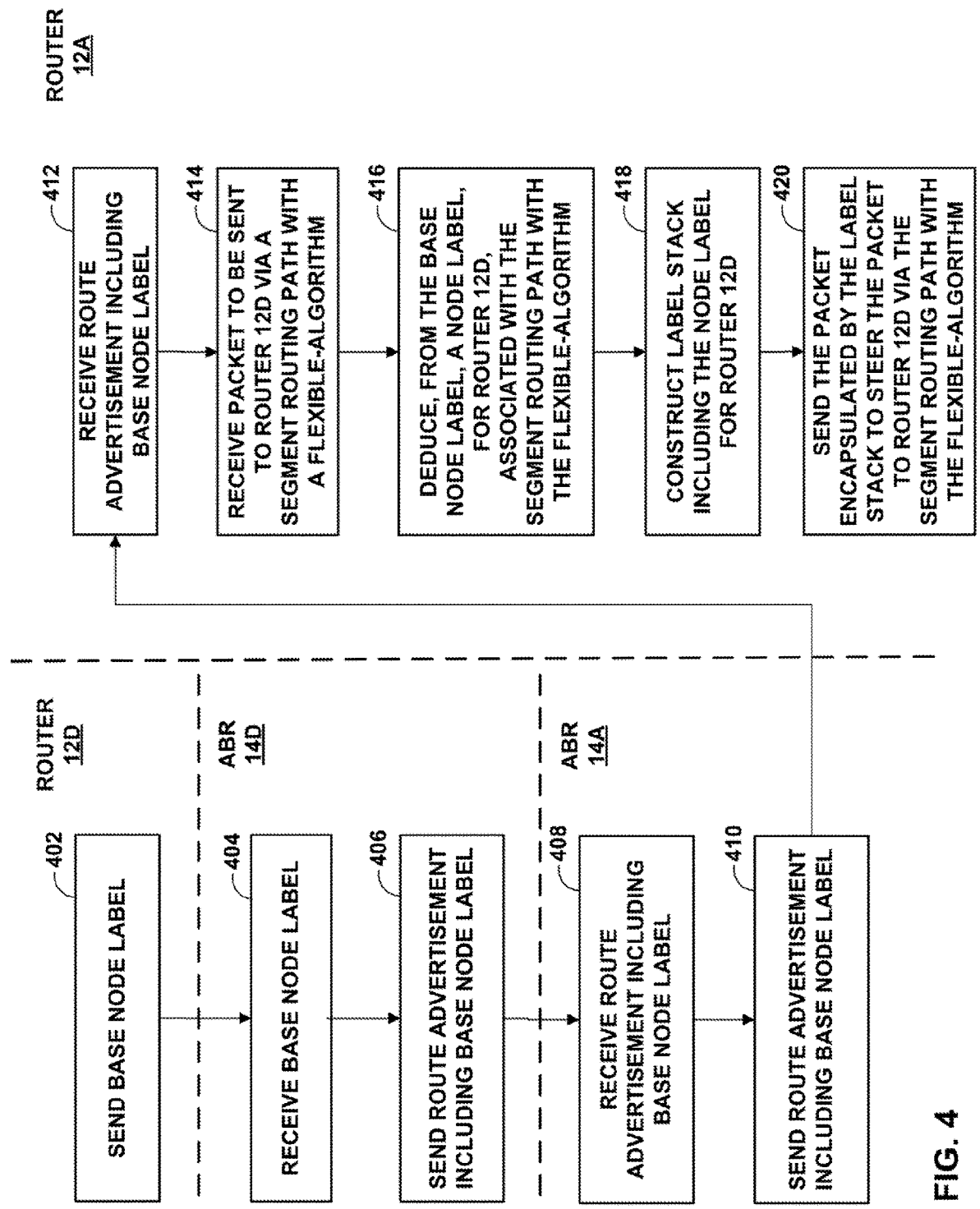
FIG. 4 is a flowchart illustrating an example operation of label deduction with flexible-algorithm, in accordance with the techniques of this disclosure.

FIG. 4 is a flowchart illustrating an example operation of deducing node labels with flexible-algorithm, in accordance with techniques described in this disclosure. The example operation is described herein with respect to network system 2 of FIG. 1.

In the example of FIG. 4, a router, e.g., router 12D sends its base node label associated with a segment routing path without flexible-algorithm (402). For example, routers 12 that participate in a default segment route (e.g., segment route without flexible-algorithm, i.e., "flexible-algorithm 0") are assigned a base node label within a node label range of 10000-19999. The node labels within the node label range for flexible-algorithm 0 is referred to herein as "base node label". The base node label may be computed based on an index of the router. For example, router 12D is configured with an index of 41. As such, router 12D is assigned a base node label of 10041. Router 12D may disseminate the base node label 10041 to other routers 12 in network system 2 via ABRs 14.

ABR 14D receives the base node label (404) and sends a route advertisement including the base node label for router 12D to other ABRs of intermediate network 4 (406). In one example, ABR 14D may use, for example, BGP labeled unicast (BGP-LU) for MPLS transport across IGP areas, e.g., areas 6. For example, ABR 14D may advertise a BGP-LU message, such as a BGP update message whose Network Layer Reachability Information (NLRI) specifies an address prefix of router 12D bound to the base node label (e.g., <prefix, [label]>) and a next hop identifying router 12D at which the prefix is bound to the base node label. In some examples in which network system 2 implements a single IGP area (e.g., all areas using IS-IS) rather than a plurality of IGP areas, ABR 14D may use Interior Gateway Protocol to transport the base node label for router 12D.

ABR 14A receives the route advertisement including the base node label (408) and sends the route advertisement to router 12A (410). Router 12A receives the route advertisement including the base node label (412) and stores the base node label. In response to receiving a packet destined router 12D (414), router 12A deduces, from the base node label, a node label, for router 12D, associated with the segment routing path with the flexible-algorithm (416). For example, router 12A may offset the base node label to fall within a node label range of the flexible-algorithm. For instance, if router 12D participates in flexible-algorithm 128, which has a node label range of 20000-29999, router 12A offsets the base node label for router 12D (e.g., 10041) by 10000 such that the node label 20041 for router 12D falls within the node label range of 20000-29999 for flexible-algorithm 128. Similarly, if router 12D participates in flexible-algorithm 129, which has a node label range of 30000-39999, router 12A offsets the base node label for router 12D by 20000 such that the node label 30041 for router 12D falls within the node label range of 30000-39999. The deduction of node labels is not limited to occurring in response to receiving a packet, but may occur at any part of the operation following the reception of the base node label.

To send a packet to router 12D via the segment routing path with the flexible-algorithm, router 12A constructs a label stack including the node label (418) and encapsulates the packet by the label stack to steer the packet to router 12D via the segment routing path with the flexible-algorithm (420).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

What is claimed is:
1. A method comprising:
  receiving, by a first router, a route advertisement including a base node label for a second router, the base node label associated with a segment routing path computed without a flexible-algorithm, wherein the segment routing path computed without the flexible-algorithm is not a constraint-based path;
  receiving, by the first router, a packet destined for the second router;
  in response to receiving the packet destined for the second router, deducing, by the first router and from the base node label, a node label for the second router by offsetting the base node label of the second router to fall within a node label range of the flexible-algorithm, the deduced node label associated with a segment routing path computed with the flexible-algorithm, wherein the segment routing path computed with the flexible-algorithm is a constraint-based path;
  constructing, by the first router, a label stack including the deduced node label for the second router to steer the packet to the second router along the segment routing path computed with the flexible-algorithm; and
  forwarding, by the first router, the packet encapsulated with the label stack including the deduced node label for the second router to steer the packet to the second router along the segment routing path computed with the flexible-algorithm.

2. The method of claim 1, wherein receiving the route advertisement including the base node label comprises receiving a Border Gateway Protocol Labeled Unicast message including Network Layer Reachability Information (NLRI) specifying a prefix of the second router bounded to the base node label for the second router.

3. The method of claim 1, wherein receiving the route advertisement including the base node label comprises receiving an Interior Gateway Protocol specifying the base node label for the second router.

4. The method of claim 1,
wherein the base node label for the second router is shared with another router,
wherein receiving the route advertisement comprises receiving the route advertisement including a label stack of the base node label for the second router and a base node label, for an area border router in an Interior Gateway Protocol area including the second router, associated with the segment routing path computed without the flexible-algorithm, wherein the label stack uniquely identifies the second router,
wherein deducing the node label for the second router further comprises deducing a node label for the area border router, wherein the node label for the area border router is associated with the segment routing path computed with the flexible-algorithm, and
wherein constructing the label stack comprises constructing the label stack including the deduced node label for the second router and the deduced node label for the area border router to steer the packet to the second router along the segment routing path computed with the flexible-algorithm.

5. The method of claim 1, wherein the node label comprises a first node label, wherein the flexible-algorithm comprises a first flexible-algorithm, wherein the second router participates in a second flexible-algorithm, wherein the label stack comprises a first label stack, wherein the packet comprises a first packet, the method further comprising:
receiving, by the first router, a second packet destined for the second router;
deducing, by the first router and from the base node label, a second node label for the second router by offsetting the base node label of the second router to fall within a node label range of the second flexible-algorithm, the deduced second node label associated with a segment routing path computed with the second flexible-algorithm; and
constructing, by the first router, a second label stack including the deduced second node label for the second router to steer the second packet to the second router along the segment routing path computed with the second flexible-algorithm.

6. A method comprising:
receiving, by a first router, a route advertisement including a label stack of a plurality of base node labels that uniquely identifies a second router, wherein the plurality of base node labels includes a base node label for the second router that is shared with another router and a base node label for an area border router in an Interior Gateway Protocol area including the second router, wherein the plurality of base node labels is associated with a segment routing path computed without a flexible-algorithm, wherein the segment routing path computed without the flexible-algorithm is not a constraint-based path;
receiving, by the first router, a packet destined for the second router;
in response to receiving the packet destined for the second router, deducing, by the first router and from the plurality of base node labels, a node label for the second router by offsetting the base node label of the second router to fall within a node label range of the flexible-algorithm and a node label for the area border router by offsetting the base node label of the area border router to fall within the node label range of the flexible-algorithm, wherein the deduced node label for the second router and the deduced node label for the area border router are associated with a segment routing path computed with the flexible-algorithm, wherein the segment routing path computed with the flexible-algorithm is a constraint-based path;
constructing, by the first router, a label stack including the deduced node label for the second router and the deduced node label for the area border router to steer the packet to the second router along the segment routing path computed with the flexible-algorithm; and
forwarding, by the first router, the packet encapsulated with the label stack including the node label for the second router and the node label for the area border router to steer the packet to the second router and the area border router along the segment routing path computed with the flexible-algorithm.

7. The method of claim 6, wherein receiving the route advertisement comprises receiving a Border Gateway Protocol Labeled Unicast message including Network Layer Reachability Information (NLRI) specifying a prefix of the router bounded to the base node label for the second router and the base node label for the area border router.

8. A system comprising:
a plurality of routers; and
a plurality of area border routers, wherein a first router of the plurality of routers and a first area border router of the plurality of area border routers is logically grouped in a first Interior Gateway Protocol (IGP) area, wherein a second router of the plurality of routers and a second area border router of the plurality of area border routers is logically grouped into a second IGP area, wherein the first router, the second router, the first area border router, and the second area border router participate in a flexible-algorithm;
wherein the first area border router is configured to:
receive, from the first router, a base node label for the first router, the base node label associated with a segment routing path computed without the flexible-algorithm, wherein the segment routing path computed without the flexible-algorithm is not a constraint-based path; and
send, to the second area border router, a route advertisement including the base node label for the first router; and
wherein the second router is configured to:
receive, from the second area border router, the route advertisement including the base node label for the first router;
receive a packet destined for the first router;
in response to receiving the packet destined for the first router, deduce, from the base node label, a node label for the first router by offsetting the base node label of the first router to fall within a node label range of the flexible-algorithm, the deduced node label associated with a segment routing path computed with the flexible-algorithm, wherein the segment routing path computed with the flexible-algorithm is a constraint-based path;

construct a label stack including the deduced node label for the first router to steer the packet to the first router via the segment routing path computed with the flexible-algorithm; and forward the packet encapsulated with the label stack including the node label for the first router to steer the packet to the first router along the segment routing path computed with the flexible-algorithm.

9. The system of claim 8, wherein the route advertisement including the base node label comprises a Border Gateway Protocol Labeled Unicast message including Network Layer Reachability Information (NLRI) specifying a prefix of the first router bounded to the base node label for the first router.

10. The system of claim 8, wherein the route advertisement including the base node label comprises an Interior Gateway Protocol specifying the base node label for the first router.

11. The system of claim 8, wherein the base node label for the first router is shared with another router, wherein the second area border router is further configured to:

receive the route advertisement including the base node label of the first router;

update the route advertisement to further include a base node label, for the first area border router, associated with the segment routing path computed without the flexible-algorithm, wherein the base node label for the first router and the base node label for the first area border router are configured as a label stack that uniquely identifies the first router; and send the updated route advertisement to the second router.

12. The system of claim 11, wherein the second router is further configured to:

receive the updated route advertisement including the label stack of the base node label for the first router and the base node label for the first area border router;

deduce a node label, for the first area border router, associated with the segment routing path computed with the flexible-algorithm, and construct the label stack including the deduced node label for the first router and the deduced node label for the first area border router to steer the packet to the first router along the segment routing path computed with the flexible-algorithm.

13. The system of claim 8, wherein the node label for the first router comprises a first node label for the first router, wherein the flexible-algorithm comprises a first flexible-algorithm, wherein the first router, the second router, the first area border router, and the second area border router participate in a second flexible-algorithm, wherein the label stack comprises a first label stack, wherein the packet comprises a first packet, wherein the second router is further configured to:

receive a second packet destined for the first router;

deduce a second node label, for the first router, associated with a segment routing path computed with the second flexible-algorithm, wherein the segment routing path computed with the second flexible-algorithm is a constraint-based path; and construct a second label stack including the second node label for the first router to steer the second packet to the first router along the segment routing path computed with the second flexible-algorithm.

* * * * *